US005973063A

United States Patent [19]
Doolan et al.

[11] Patent Number: 5,973,063
[45] Date of Patent: Oct. 26, 1999

[54] POLYURETHANE THICKENERS USEFUL FOR CLEAR AND HIGH GLOSS AQUEOUS BASED SYSTEMS A PROCESS FOR PROVIDING RHEOLOGICAL PROPERTIES TO CLEAR AQEOUS-BASED SYSTEMS USING SUCH THICKENERS AND CLEAR AQUEOUS-BASED SYSTEMS CONTAINING SUCH THICKENERS

[75] Inventors: Joseph Doolan, Hightstown; Charles Cody, Robbinsville, both of N.J.; Wilbur Mardis, Southampton, Pa.; Anthony Ricci, Jackson; Fred Whitton, Pt. Pleasant, both of N.J.

[73] Assignee: Rheox, Inc., Hightstown, N.J.

[21] Appl. No.: 08/937,027

[22] Filed: Sep. 24, 1997

[51] Int. Cl.$^6$ .............................. C08J 3/00; C08K 3/20; C08L 75/00
[52] U.S. Cl. ...................... 524/591; 524/839; 524/840
[58] Field of Search ............................... 524/591, 839, 524/840

[56] References Cited

U.S. PATENT DOCUMENTS 5,023,309  6/1991  Kruse et al. ............................... 528/49

*Primary Examiner*—Patrick D. Niland
*Attorney, Agent, or Firm*—Michael J. Cronin

[57] ABSTRACT

The present invention relates to improved thickening compositions, often referred to as Theological additives, used to provide viscosity control, flow, leveling and other rheological properties to clear aqueous systems such as automotive clear-coat paints and coatings. The invention hereof involves the synthesis of a new family of Theological additives by combining, through a reaction process, chemicals used to make specified polyurethane polymer compositions. These novel copolymers provides the good flow and leveling and gloss retention that polyurethane associative thickeners impart to water-based systems, without the loss of clarity that such polymers have caused in the past. Levels of the rheological thickening composition, varying between about 0.01% and about 10%, based on the total weight of the system to be thickened, have been found to be useful to create novel clear aqueous systems containing such thickening compositions.

21 Claims, No Drawings

POLYURETHANE THICKENERS USEFUL FOR CLEAR AND HIGH GLOSS AQUEOUS BASED SYSTEMS A PROCESS FOR PROVIDING RHEOLOGICAL PROPERTIES TO CLEAR AQEOUS-BASED SYSTEMS USING SUCH THICKENERS AND CLEAR AQUEOUS-BASED SYSTEMS CONTAINING SUCH THICKENERS

BACKGROUND OF THE INVENTION

1. Brief Description of the Invention

The present invention relates to improved polyurethane thickeners, often referred to as rheological additives, used to provide viscosity control, flow, leveling and other rheological properties to clear and high gloss aqueous systems such as clear coats and clear coatings including textile coatings. The invention also includes a method of making such improved polyurethane thickeners, clear aqueous systems containing such thickeners and a method of thickening clear aqueous systems using such thickeners.

Coatings have been widely used to beautify and in addition to protect an underlying substrate. A growing new area of coatings are clear aqueous systems used for example as automotive clear coats. Clear aqueous systems must provide transparency and depth of field, as well as other optical properties, after application in addition to protecting the underlying surface. Clear aqueous systems include automotive clear coatings, wood lacquers, paints and other clear coatings, varnishes and textile coatings.

The invention hereof involves the synthesis of a new family of polyurethane rheological polymers especially suitable for clear systems by combining, through a reaction process, a defined set of chemicals to make such polyurethane polymers. These polymers provide both good flow and leveling and gloss retention to clear water-based systems. There has been a need for some time for a rheological additive for clear systems which imparts Theological properties including sag resistance and shear thinning, and which simultaneously does not adversely affect the clarity, transparency and gloss of such clear systems. The product of the instant invention results in a valuable Theological additive for a large variety of modern clear and transparent aqueous systems. Some companies in the past have used polyurethane thickeners in clear systems, but this use has generally resulted in some amount of haziness in the finished film.

The Paint and Coatings Dictionary, published by the Societies For Coatings Technology in 1978, defines a clear system or coating as a transparent protective and/or decorative film. Typical applications for such clear coatings include interior clear wood finishes, furniture polishes, water-based lacquers and automotive clearcoat finishes, and many other common commercial uses.

2. Description of the Prior Art

General

It has long been known that Theological additives, which are added at only a relatively small weight percentage to pigmented aqueous systems, can modify the rheology of aqueous systems to satisfy various aesthetic and application criteria. Aqueous systems so modified have included latex paints, protective coatings, paper coatings, household detergents, cosmetics and personal care items, adhesives and sealants, inks, drilling fluids, and the like.

Rheological additives are thixotropes which impart a three dimensional network to liquid systems as expressed by increased viscosity at low shear rates. When the system is sheared at high shear rates, this network is broken down, resulting in a decrease in viscosity; the network recovers when the external force is removed. The rate of recovery determines the application properties of the system such as the degree of sag resistance and leveling. Rheological additives are added at about 0.01% to about 10% (depending on the thickener, the characteristics of the system to be thickened and the desired Theological profile) based on the total weight of the system to be thickened. Often the terms thixotrope, thickener, and rheological additive are used interchangeably.

Many Theological additives for latex water based systems are available: natural, modified natural and synthetic. Natural Theological additives include guar gum, pectin, casein, carrageanan, xanthan gum and alginates. Modified additives include modified celluloses, most particularly methyl cellulose, hydroxyethyl cellulose, hydroxypropyl cellulose, and carboxymethyl cellulose.

In the last twenty years, synthetic rheological additives including polyurethanes have assumed increased commercial importance versus natural and modified rheological additives. These newer synthetic thickeners provide improved pigment suspension and improved application properties. In water based systems including latex paints, it is highly desired that such systems be flowable during their application, but that they not sag after they have been applied. It is further desired that the resulting coating form a homogeneous film and a smooth flat surface. Such Theological additives may be added to the aqueous latex system at any time including during the grinding stage or after the pigment has been dispersed, i.e., as a post-additive.

Two patents issued to RHEOX Inc., the assignee herein, describe a family of polyether polyurethane thickening compositions for latex paints. These patents, U.S. Pat. Nos. 4,499,233 and 5,023,309, describe these Theological additives as the reaction product of polyisocyanates, polyether polyols, modifying agents which contain at least one pendant internal hydrophobic group and at least two active hydrogen moieties terminated by a capping agent. Capping agents recited include alcohols, amines, carboxylic acids and mercaptan.

Another family of polyurethane synthetic thickeners used extensively in commercial applications for opaque latex paints is described in U.S. Pat. Nos. 4,079,028 and 4,155,892. These thickeners are described as prepared by reacting at least one water soluble polyether polyol and a diiosocyanate with at least one monofunctional hydrophobic organic compound, usually an organic monoisocyanate. Branched amines, branched monoisocyanates and branched polyether alcohols are disclosed as possible capping agents.

A related type of polyurethane thickener is a water-soluble thermoplastic organic polymer having a number of monovalent hydrophobic groups incorporated in the internal portion of the polymer molecule. U.S. Pat. Nos. 4,496,708 and 4,426,485, issued to Union Carbide Corporation, describe polyurethane thickeners for latex paints which are water-soluble comb-like polymers containing a number of pendant internal hydrophobic groups.

The above-described latex paint Theological additives have often been generally referred to by the term polyurethane associative thickeners. Associative thickeners are so-called because the mechanism by which they thicken involves hydrophobic associations between the hydrophobic species in the thickener molecules and other hydrophobic surfaces, either on other thickener molecules or on latex particles, pigments or micelles in the system to be thickened.

Aqueous clear systems such as clear wood coats and furniture varnishes and lacquers have become increasingly utilized, gradually replacing organic or solvent based clear systems, to impart various optical and protective properties, including enhanced highlighting of new types of base coats. When used as paints and varnishes, such clear coatings are applied directly on the substrate to be coated, or on an initial base coat, to protect the substrate and at the same time to impart a clear, shiny look to the product. When used with a base coat, the clear coating also protects the base coating or wood substrate from damages such as scratches and stains, and adds a variety of aesthetic qualities to the system involved.

In addition, a number of new aqueous-based industrial and consumer products are, for a variety of reasons, being manufactured in a clear form; that is, they are designed to be effectively transparent. Such transparency is intended to indicate in many cases a more natural and pure product which will appeal to customers both aesthetically and as an indication of the product's purity. Such water based products include, for example, detergents, lotions and various household and some personal care and cosmetic products.

In the past, most clear lacquers and varnishes have contained about 80% solvent. The thickening effect in such lacquers and varnishes was often achieved mostly by solvent evaporation. There is, therefore, a trend in the varnish industry in which manufacturers of such systems are moving from high solvent systems to aqueous systems to comply with stricter environmental limits on volatile organic emissions. Water, however, evaporates more slowly than most organic solvents leading to only a small increase in solids as the coating is sprayed. Furthermore, in many water based coatings, all of the principal solid components are not in the continuous phase (the water), such that large changes in solids content are required to bring about substantive increases in viscosity. Finally, the role of evaporation of water from the coating during and after application is lightly dependent on the relative humidity which is a variable that is difficult—or costly—to control. For the above reasons, there is a growing commercial need to modify the Theological properties of clear aqueous systems by use of a thickener which will impart sag resistance and shear thinning behavior but will not adversely affect the clarity, transparency and gloss of the dried coating.

To date several of the Theological additives employed in clear coat systems were developed for and have been primarily intended as thickeners for latex type non-clear aqueous coatings, and some have been used in clear coat formulations simply because they were available. However, the ideal clear coat Theological additive requires special features not commonly found in thickeners intended for general use, such as an ability to yield a clear dried film, predictable incorporation in clear coat formulations which vary to some degree in composition due to manufactured raw materials, thermal stability of the coating system upon storage and sufficient overall efficiency. Thus, a need existed for the scientific community to undertake development of Theological additives primarily focused upon application to clear coat formulations. The instant invention described herein serves to fulfill this need.

As discussed, clear coating systems are becoming particularly common in formulations for use for furniture, wood fixtures, textiles and automotive paints. When multicoat coating systems are applied, it has proved difficult to obtain coatings having good dispersibility and uniformly high gloss while at the same time maintaining excellent color and clarity. In the wood coatings industry, clear coats, increasingly based on aqueous systems, are being utilized. These paint systems must possess chemical resistance, resistance to cracking and other useful properties. At the same time, it is and has been an objective of the above industries to continually improve the aesthetic and clarity properties of their clear formulations. In automotive coatings a pigmented base coat composition is applied to a metal substrate to hide imperfections and blemishes and to provide the aesthetically pleasing colors desired. This step is followed by the application of a "clear coat" topcoat. The most significant quality of the clear topcoat is that it provides a transparent film. The term "transparent film" is defined as the film (when dried) through which the coat below (basecoat) can be seen.

The most important aspect of a clear top coat is that it be substantially transparent so that the full polychromatic and aesthetic effect of the basecoat is not decreased. In some instances, desirable and unique styling effects can be obtained by the addition of contrasting or complementary colors or particles to the topcoat. Another feature of the clear topcoat is the significant improvement in the durability which is provided to the overall coating composition.

Prior art polyurethane thickeners, while useful in providing viscosity improvements to pigmented latex paints, have almost always failed to achieve universal acceptability in clear systems by formulators because they can impart a haze to the final film. It is speculated that this phenomenon is due to basic polymer—polymer incompatability. It has long been known that a given organic polymer is not necessarily readily compatible with another organic, and the inventors have concluded that this incompatibility leads to non-homogeneous physical states; one common manifestation of this in clear systems is a hazy, darkened or translucent dried final film. Thus, the useful features of common polyurethane latex thickeners intended for aqueous systems of a general nature are lost when attempts are made to use them as thixotropic additives in clearcoat systems.

An excellent text discussing the theories of polymer compatibility and incompatibility is: F. W. Billmeyer, "*Textbook of Polymer Science*", Third Edition, Wiley-Interscience, 1984.

While not directed to clear systems, Rohm and Haas has issued at least four relatively recent thickener patents; two relate to carboxylic acid chemistry, (U.S. Pat. Nos. 5,182,327 and 5,256,724) and two to polyurethane chemistry U.S. Pat. Nos. 5,281,654 (discussion of branched alcohols but only as adducts with alkylene oxide as capping agents) and U.S. Pat. No. 4,180,491 (discussion similar to U.S. Pat. No. 5,281,654). Two relatively new 1995 and 1997 Bayer patents involve polyurethane thickeners—see U.S. Pat. Nos. 5,594,087 and 5,378,756. One of these patents discusses a mixture of specific hydrophilic/hydrophobic alcohols as reactants to make the polyurethanes described.

There are a limited number of prior art patents relating to thickeners for clear coats. U.S. Pat. No. 4,748,049 involves a polyacrylate thickener which facilitates applying "crystal clear" coatings to vertical surfaces. U.S. Pat. No. 5,182,142 uses a wide variety of thickeners, mostly cellulosics, but also gums and polyacrylics for "transparent coatings" for molded rubber articles. Recent U.S. Pat. No. 5,506,325 uses a non-gelled copolymer based on methyl methacrylate/acrylic acid chemistry for "colored and/or clear coating systems". 1987 German language European Patent No. 0301300 to BASF (no English equivalent found) involves a polyester polyol/polyisocyanate chemical for decorative clear coats.

OBJECT OF THE INVENTION

It is an object of the present invention to solve or substantially alleviate the problems created by prior art polyurethane latex thickeners and provide a polyurethane thickener especially useful for clear aqueous systems. It is, therefore, a more specific object of the present invention to provide a polyurethane thickener which is useful for increasing the viscosity of a clear water-based system in an improved efficient manner, more easily and without the loss of clarity caused so often by prior art thickeners.

It is another object of the present invention to provide a clear aqueous system containing a polyurethane thickener providing Theological properties of the type described.

It is a further object of the invention to provide a thickener additive which can easily be made using available commercial materials and current process technology, including solution and solvent-free polymerization techniques, on a continuous, semi-continuous, or batch basis.

It is a further object of the invention to provide a polyurethane thickener that can be readily dispersed into the clear system to be thickened, which is easily handled, and which can readily be incorporated.

Other objects, as well as advantages, of the invention will become clear from the following summary and description, or will become apparent to the skilled artisan, as obvious variations of the instant invention.

DESCRIPTION OF THE PREFERRED EMBODIMENTS

The polyurethane thickeners of the instant invention are reaction products synthesized by producing a polymer comprised of the reaction product of:

a) one or more polyisocyanates;

b) one or more polyether polyols;

c) one or more branched aliphatic, cycloaliphatic or aromatic compounds containing an active hydroxyl functional group, referred to as branched capping agents and d) optionally, one or more modifying agents having at least two moieties reactive with component a) or b) and at least one hydrophobic group.

Element (a), the one or more polyisocyanates, should contain at least two isocyanate groups per molecule and may be linear or branched, aliphatic, cycloaliphatic, or aromatic.

The polyisocyanate preferably contains two isocyanate moieties per molecule. Higher functionality polyisocyanates may be used as a portion of the total isocyanate requirement. However, the use of higher functionality polyisocyanates is limited by the possibility of the formation of a crosslinked, insoluble gel which is unsuitable for purposes of the present invention. Tri- and higher functional polyisocyanates, if used, generally should constitute less than about 20 mole % of the total isocyanate minimum requirement. Preferably, tri- and higher functional polyisocyanates constitute less than about 10 mole % and, most preferably, they are absent from the polyisocyanate.

Exemplary polyisocyanates useful in the preparation of the prepolymer of the present invention are 1,6-hexamethylene diisocyanate; 1,4-tetramethylene diisocyanate; a product designated Vestanat TMDI made by Hüls America, Inc., which is a 40:60 (by weight) mix of 2,2,4-trimethyl hexamethylene-1,6-diisocyanate and 2,4,4-trimethylhexamethylene - 1,6-diioscyanate; 1,10-decamethylene diisocyanate; 1,4-cyclohexylene diisocyanate; 4,4'-methylene bis-(isocyanatocyclohexane); 1-isocyanato-3-isocyanatomethyl-3,5,5-trimethylcyclohexane; m- and p-phenylene diisocyanate; 2,6- and 2,4-tolylene diisocyanate; xylene diisocyanate; 4-chloro-1,3-phenylene diisocyanate; 4,4'-biphenylene diisocyanate; 4,4'-methylene diphenylisocyanate; 1,5-naphthylene diisocyanate; 1,5-tetrahydronaphthylene diisocyanate; polymethylene polyphenylisocyanates sold under the brand name "PAPI" such as "PAPI 135" (equivalent weight of 133.5 and average isocyanate functionality of 2.7) and "PAPI 901" (equivalent weight of 133 and average isocyanate functionality of 2.3), the aromatic triisocyanate adduct of trimethylol propane and tolylene diisocyanate sold under the brand name "Mondur CB-75"; the aliphatic triisocyanate product of the hydrolytic trimerization of 1,6-hexamethylene diisocyanate sold under the brand name "Desmodur N"; $C_{36}$ dimer acid diisocyanate sold under the brand name "DDI", based on dimer acids as discussed in J. Am. Oil Chem. Soc. 51, 522 (1974) and mixtures thereof Preferred polyisocyanates include 1,6-hexamethylene diisocyanate; Vestanat TMDI; 1-isocyanato-3-isocyanatomethyl-3,5,5-trimethylcyclohexane; the 2,6- and 2,4-tolylene diisocyanates; and mixtures thereof. Most preferred are the above referenced two tolylene diisocyanate isomers and mixtures thereof and Vestanat TMDI.

It is to be understood that the polyisocyanate molecule or molecules can contain functional moieties other than isocyanate if these additional moieties are substantially unreactive with either the isocyanate or the active hydrogen groups under the reaction conditions for the preparation of the prepolymer of this invention. Consistent with this understanding, the term "polyisocyanate" and the named polyisocyanates encompass such materials unless otherwise indicated. Exemplary moieties which do not adversely affect the reaction include: ketones; esters, and aldehydes; amides, particularly N,N-disubstituted amides; halogenated hydrocarbons; ethers; and tertiary amines.

Element (b), the polyether polyol component used in the present invention, can be selected from a wide variety of commercial products; a representative formula for useful polyol polymers are polymers having the repeating unit:

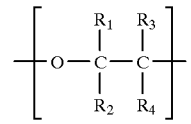

wherein $R_1$, $R_2$, $R_3$ and $R_4$ are independently selected from the group consisting of H, $CH_3$ and $C_2H_5$. The polyol polymer must be water dispersible. In a given polyol more than one type of repeating unit can be found. The average molecular weight of the polyether polyol should be from about 200 to about 20,000, preferably from about 2,000 to about 14,000, and most preferably from about 2,000 to about 10,000.

The polyether polyol used should have a hydroxyl moiety substantially at each terminus of the polyether chain and/or have one end of the polyether chain linked to a central molecule having at least one additional active hydrogen moiety and/or polyether chain attached thereto. This definition includes low and medium molecular weight polyurethane prepolymers having at least two hydroxyl moieties. In this regard, the polyether polyol may also be a three-dimensional polyether polyol formed by the combination of at least one polyether polyol with a material having three or more moieties, onto which the polyether chain may be formed or reacted. Such moieties include amine, carboxylic acid, and hydroxyl functions, and mixtures thereof Representative examples of these tri-and higher function materials include ethanolamine, glycerol, trimethylol propane, pentaerythritol, sorbitol, malic acid, tartaric acid, and citric acid.

Exemplary preferred polyether polyols useful for the present invention are polyethylene glycol, random and block copolymers of a group of diols consisting of ethylene glycol, copolymers with propylene glycol and/or butylene glycol, and polyether polyol adducts of glycerol, ethylene glycol with glycerol, trimethylolpropane, and pentaerythritol and mixtures thereof The polyol component may be comprised of one or more polyol compounds, either of the same (e.g. polyethylene glycols of differing molecular weights) or differing (e.g. mixtures of polyethylene and polypropylene glycols) chemical types. Preferred polyether polyols are polyethylene glycol and mixtures of two polyethylene glycols of differing molecular weight.

Amounts of components a) and b) are to be selected so that the isocyanate is in excess as known in the art. The excess isocyanate groups are ultimately capped with elements c) as described hereafter. The number of equivalents of c) is preferrably selected to be approximately equal to the number of equivalents of the moiety in excess from the reaction of components a) and b) and optional component d).

As the name indicates, element (c), the branched capping agent is used to cap the ends of the polymer chain. This prevents further reaction of the chain ends which might cause the polymer to become non-dispersable in water. The use of the branched capping agent reduces the toxicity of the final polyurethane. Most importantly, if properly selected, the branched capping agent increases the low shear viscosity efficiency and at the same time assures that no diminishing of clarity in the clear coat system occurs.

The capping agent should be a branched aliphatic, cycloaliphatic or aromatic compound containing a hydroxyl moiety that is capable of reacting with the end group of the uncapped prepolymer chain in the preferred embodiment of the invention. The capping agent may contain other moieties in addition to said one or more hydroxyl moieties (that function to terminate the prepolymer chain growth); however, these additional moieties preferrably should not be reactive with an isocyanate functionality under the reaction conditions used in the preparation of the thickener of this invention. Such moieties may include ketones, aldehydes, esters, hydrogenated hydrocarbons, tertiary amines, ethers and amides, particularly N,N-disubstituted amides.

Branched capping agents are based on carbon compounds generally fitting within the following definition:

A series of carbon atoms directly connected by chemical bonds (chains) constitutes the structural configuration of almost all carbon compounds. Such chains are often shown without their accompanying hydrogen. A branched chain can generally be characterized as a linear series of chemically bonded carbon atoms with a straight chain but also having one or more additional chain or chains of one or more carbon atoms. If the branching occurs such that two smaller chains are linked to the end atom of a longer chain, it is commonly referred to as a "forked" chain. If a small chain is attached to the middle of a longer chain, it is referred to as a "lateral" or "side" branched chain. The preferred branched capping agents of the instant invention are lateral branched chains with the active hydrogen moiety on one end of any chain and the length of the carbon chain that the active hydrogen moiety is attached to is 5 carbon atoms or less.

A closed chain or ring being a cyclic arrangement of carbon atoms giving a closed geometric structure, i.e., a ring, pentagon or other form, with characteristics of alicyclic, aromatic, and heterocyclic compounds with a side chain of carbon atoms can also be used as a branched capping agent.

The branched capping agent, which contains a hydroxyl moiety, is to be selected so as to be reactive with an isocyanate moiety and the amount of a particular capping agent is dependent on the reaction conditions and amounts of the other reactants, particularly elements a) and b) and optional element d). If a synthesis route is selected so that a prepolymer results before capping, as well known, the reaction constituents are chosen such that the uncapped modified polyurethane is substantially isocyanate-terminated and the capping agent contains one active hydrogen moiety capable of reacting with an isocyanate moiety.

A preferred set of branched alcohols useful as capping agents are of the following type:

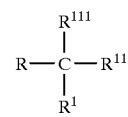

where R=HO—$CH_2$—$(CH_2)_k$ with k=0 to 4
$R^1$=$(CH_2)_m$ $CH_3$ where m=4 to 14
$R^{11}$=$(CH_2)_n$ $CH_3$ where n=2 to 10
$R^{111}$=$H_1$, $CH_3$, or $C_2$ $H_5$ with H being preferred
and the total carbon content of the branched alcohol preferably is from 10 to 24.

Commercally available useful products include the Isofol line of branched alcohols obtained from the CONDEA Vista Company.

Mixtures of branched capping agents and mixtures of one or more branched capping agents and traditional non-branched capping are also useful.

Element (d), the optional modifying agent or agents, is any molecule which is characterized by the presence of at least one hydrophobic group and at least two moieties reactive with an isocyanate group. Exemplary active hydrogen moieties are primary amino, secondary amino, hydroxy, carboxy and mercapto groups. The amount of element d) is preferably selected such that the sum of the equivalents of the active hydrogen groups of d) and the hydroxyl moieties of b) are less than the equivalent of isocyanate provided by element a).

The ability of the chemist to include element (d) in the synthesis of the inventive thixotropic additive for clear coat systems provides an independent method of varying the hydrophobic character of the polymer. Thus, if a low molecular weight branched cap is selected the overall hydrophobic character of the additives can be increased by the proper selection of modifying element (d) whereas if a high molecular weight branched cap is employed then the rest of the polymer need only include reactive elements (a) and (b). The ability to adjust the hydrophobic character of the additives is important so that rheological additive polymer-coating polymer compatability can be maintained to produce clear dried films.

The optional modifying agent preferably has at least 10 carbon atoms with the hydrophobic group having no moieties reactive with the polyisocyanate or the polyether polyol. Pendant hydrophobic groups are preferred. The pendant hydrophobic group is typically a hydrocarbon group, but it can contain moieties, such as halogen or alkoxy groups. The term "pendant" is used to indicate that the hydrophobic group extends in whole or in substantial part from the polymer chain rather than being totally incorporated into the polymer chain—see U.S. Pat. No. 5,023,309 which is incorporated by reference.

In the associative thickening mechanism of the instant invention, it is generally hypothesized that the hydrophobic moieties of the thickening composition of this invention are dispersed into the ingredients contained in the clear aqueous system where they then associate forming a network-like structure. Under the application of shear, the associated units are mechanically separated causing the decrease in viscosity known as "shear thinning." Upon the removal of shear force, the hydrophobic moieties again associate (recover) in a diffusion-controlled process, reforming a three-dimensional network, resulting in a viscosity increase at a relatively controlled rate resulting in good flow and leveling properties. This mechanistic interpretation of molecular behavior illustrates how the polymeric thickeners of the instant invention display increased efficiency in a clear system coupled with improved flow and leveling properties. While not wishing to be bound by hypothesis, it is believed that the novel thickeners of this invention work without causing a loss of clarity because the rheological agents of the instant invention have dispersed in the coating and thus the polymer-polymer incompatibility that causes haziness is eliminated. Another interpretation is that the micelles (or domains) of the interactive hydrophobes are sufficiently small as to be invisible, that is, they do not refract light.

In a preferred embodiment, the present invention provides a polyurethane which is the product of the reaction as described above of:

One or more polyetherpolyol(s),
One or more (di) polyisocyanate(s), and
One or more branched capping agent(s).

The inventive polymers may be prepared by polymerizing the employed monomers by any method known in the art such as by solution, suspension, or solvent-free or melt polymerization on a batch, continuous or semi-continuous basis.

As a preferred embodiment, solution polymerization of the inventive polymer is generally conducted in the following manner: To a reaction flask or vessel, equipped with a nitrogen inlet, stirrer, trap, condenser and heating jacket, is added a suitable solvent and polyglycol of an appropriate molecular weight. This mixture is heated to azeotrope off water and then cooled. A diisocyanate compound is added with a catalyst, and the reaction is held under a nitrogen blanket for several hours at the desired temperature. The branched capping agent is then added to the reaction and after a sufficient time, the solution is discharged into an evaporation pan to remove the solvent and isolate the solid polymer product. This solid product may be used directly or then dissolved/dispersed in, for example, a water/co-solvent mixture to give a pourable, low viscosity liquid product.

If a melt or solvent-free process is used, the polyglycol is placed in a mixer, heated and dewatered under vacuum for several hours. The vacuum is released and the temperature is stabilized. The diisocyanate and catalyst are added and, after a suitable reaction time, the capping agent is added and allowed to react. The molten polymer is then discharged; it may be used directly or dissolved/dispersed into a water/co-solvent mixture.

In both the solution and melt processes described above, the capping agent may also be added simultaneously with the diisocyante.

The use of the inventive additive for clear coat systems involves two important and independent factors—dispersion of the additive into the liquid coating to provide necessary rheology and formation of a clear non-hazy film upon drying. Dispersion as described here represents true solubilization, formation of micelles on a microscopic scale or the breaking up of the additive into minute particles distinct and separable from one another which are suspended in the clear liquid coating. The ability to disperse the instant invention is in part a function of the cap employed; as the total carbon content of the cap increases, the inventive Theological additive becomes more hydrophobic and thus can be harder to disperse in water-based coatings.

The proper hydrophobic/hydrophilic balance required to achieve ready dispersion of the inventive rheological additive described herein into the clear aqueous coating composition can be achieved in numerous ways; some of which are changing the molecular weight of the cap, using mixtures of caps of various molecular weights, using mixtures of branched and linear caps on a single polymer molecule, using mixtures of polymer molecules containing linear caps with polymers containing branched caps, adjusting the hydrophobic balance of the polymer backbone by the use of a pendant modifier, or combinations and permutations of any of the above ways.

The polymeric product of the present invention, whether used as a solid or solution, will thicken clear aqueous compositions, particularly clear aqueous coating compositions, upon dispersion of the polymer into the clear aqueous composition to be thickened.

The amount of the polymer thickener that may be incorporated in any given aqueous composition depends on the particular system and the viscosity desired. Although any effective amount of the polymer thickener may be employed, typically from about 0.05 to about 20%, preferably from about 0.1 to about 3% by weight, based on the weight of the final aqueous composition including polymer is used.

For automotive clear-coat compositions and wood coating compositions, the polyurethane thickener may be incorporated therein in an amount of from about 0.05 to about 5%, and preferably from about 0.1 to about 3% by weight, based on the weight of the total composition including the polyurethane. The mixing of the novel polymeric thickener into a clear coating system is particularly easy as the polyurethane thickener of the invention is most often readily dispersible. In the normal situation, the appropriate amount is mixed into the system using common paint milling apparatus. The novel thickener may be added as a powder or as a polymer/water/co-solvent liquid mixture. The more usual method of application of the polyurethane polymer of the present invention for thickening a clear system is to add the polymer in liquid form to the medium to be thickened then mixing the ingredients. The thickener can be mixed into the clear aqueous system using conventional mixing equipment such as sand mills, medium and high speed dispersing apparatus, paddle mixers, pebble mills, ball mills, and similar well-known mixture apparatus.

The polymers of the present invention can be employed as thickeners for controlling viscosity and rheology of clear aqueous-based compositions and also other more traditional aqueous paint systems. An aqueous- based composition is herein defined to be a composition wherein water comprises from about 5% to nearly 100% by weight of the total composition. The inventive polymers may be used to impart rheological properties to water solutions such as those used in varnishes and lacquers.

Other clear aqueous compositions to which the inventive polymers can be added for thickening purposes include cosmetics, paper coatings, varnishes, stains, and furniture finishes. Clear aqueous compositions include additional compositions which are applied to textiles such as warp sizing liquids and fluid backings for rugs and similar pile fabrics. Further applications include acrylic latex textile coatings. These systems include clear leather coatings, heavy duty fabric coatings, and protective plastic furniture covers where glass and transparent top coats are required.

The polymeric compositions described above are easily made and easily dispersed Theological additives equal to or better than comparable higher-cost products with a wide spectrum of uses.

The present invention is further illustrated by the following examples. All parts and percentages in the examples as well as in the specification and claims are by weight unless otherwise specified. The following examples are illustrations designed to assist those skilled in the art to practice the present invention, but are not intended to limit the invention. Changes can be made without departing from the spirit of the invention. The various chemicals used in the examples are commercial materials.

EXAMPLE 1

A blend of 3350 and 8000 molecular weight poly(ethylene glycol) was made up to give an average molecular weight of approximately 3400 g/mole. While mixing, the poly(ethylene glycol) was dewatered under vaccum for 3 hrs.; the temperature was then stabilized at 75° C. and the reactor contents placed under a nitrogen blanket. A mixture of dodecanol and hexadecanol was added to serve as the linear cap; 1,6-hexamethylene diisocyanate was also added to the reactor and mixed for two minutes. A tin catalyst was then added and the reaction allowed to continue for 30 minutes. A diamine modifier, Kemamine D-970 (Witco Corp.), was added and allowed to react for 20 minutes. The molten polymer was then discharged to water/cosolvent solution to give a final product of 25% polymer/15% butyl Carbitol/60% water. This polymer was designated Comparative A.

EXAMPLE 2

The same procedure as used for Example 1 was used to synthesize a second polyurethane with the following changes: 1) a single poly(ethylene glycol) having a molecular weight of 8000 g/mole was used; 2) Armeen 12 (Witco Corp.) was used as the linear cap, VESTANAT TMDI (Huls America Inc.) was used as the diisocyanate, and Duomeen C (Witco Corp.) was used as the diamine modifier. This polymer was made up into the same water/cosolvent solution and designated Comparative B.

EXAMPLE 3: SYNTHESIS OF AN EXAMPLE OF AN INVENTIVE POLYURETHANE

A blend of 3350 and 8000 molecular weight poly(ethylene glycols)—3500 and 8000 molecular weights—was made up to give an average molecular weight of 3440 g/mol. 1300 g of this blend was placed in a 1 gallon Sigma mixer and dewatered under vacuum for 3 hours. The vacuum is released, the temperature brought to 75° C., and the reactor contents placed under a nitrogen blanket. 105.97 g of VESTANAT TMDI (Huls America Inc.) was added to the reactor and allowed to mix for 2 minutes 2.30 g dibutyltin dilaurate catalyst is added and the reaction allowed to take place for 30 minutes. A branched alcohol, 75.08g Isofol 20 (CONDEA Vista Co., total carbon content of 20, i.e. $C_{20}$) used as a cap was added and allowed to react for 30 minutes. The molten polymer was then discharged to a butyl Carbitol/water solution to give a final product of 25% polymer/18.5% butyl Carbitol/56.5% water. The polyurethane obtained was designated Compound 1.

EXAMPLE 4: SYNTHESIS OF ANOTHER INVENTION POLYURETHANE

The same procedure as outlined above for Example 3 was used to synthesize a polyurethane with the following reactants: 1300 g of a blend of 3350 and 8000 molecular weight poly(ethylene glycol) to give an average molecular weight of 4512 g/mole was used along with 80.79 g VESTANAT TMDI, 2.30 g dibutyltin dilaurate, and 57.27 g Isofol 20.

This experiment was carried out to access the effect of a change in molecular weight of the polymeric Theological additive, i.e. to compare Examples 3 and 4. The polymer obtained was designated Compound 2. Note that the synthesis experiments can also be carried out in any solvent that will not react with the diisocyanates in the reaction, such as toluene; the procedure would then be modified at the end of the reaction to allow for the removal of the solvent.

EXAMPLE 5—USE AS RHEOLOGICAL ADDITIVES IN CLEAR SYSTEMS

The above described polymers were used as rheological additives in a commercial clearcoat masterbatch to give the following results:

TABLE 1

| Sample | Loading (% by wt.) | #2 Zahn Cup Viscosity Before Catalyst (sec) | #2 Zahn Cup Viscosity After Catalyst (sec) | Clarity* |
| --- | --- | --- | --- | --- |
| COMPARATIVE A | 3.5 | 28 | 26 | Hazy |
| COMPARATIVE B | 3.5 | 25 | 23 | Hazy |
| COMPOUND 1 | 2.6 | 32 | 27 | Clear |
| COMPOUND 2 | 2.6 | 31 | 26 | Clear |
| Acrysol RM-825** | 3.5 | 27 | 23 | Clear |

*Clarity, observed visually, of the dried film on plastic and coated black paper.
**A commercal paint thickener made by Rohm & Haas Co. selected as a control. Some clear coat manufacturers have reported using this product as a thickener with sporadic clarity results in various formulations.

All coatings were applied at 3 mils wet film thickness on clear polyester panels (Leneta Co., No. 100, Form P300-7C) and sealed black charts (Leneta Co., No. 250, Form BK), air dried 15 minutes and force dried for 5 minutes at 150° F.

DISCUSSION OF RESULTS

Examination of the results in Table 1 indicate that both inventive examples lead to more efficient thickeners with enhanced film clarity compared to Comparative A and Comparative B. Note also that the changes in poly(ethylene glycol) molecular weight between the inventive examples had no material effect upon dried film clarity, although the lower molecular weight product was noticeably more readily dispersible in the masterbatch. Additionally, both inventive examples demonstrate increased efficiency over Acrysol RM-825.

It is clear from the above results that the replacement of the linear capping agents with branched caps leads to experimental products that have excellent Theological features as well as a high level of clarity in the clearcoat film.

EXAMPLE 6: COMPOUND 1 IN ADDITION CLEAR FORMULATIONS

The reaction product made in example 3 was tested in five commercial clear coat formulations with the results shown in Table 2.

TABLE 2

Evaluation of Compound 1 vs. RM-825 in Various Published Clear Wood Coat Systems

|  | Loading Level % Tot. Wt. | Viscosity #2 Zahn Cup No Catalyst | Viscosity #2 Zahn w/Catalyst | 3 mils Wet on clear Polyester | 3 mils Wet on Black Sealed Paper |
|---|---|---|---|---|---|
| *Acid-Catalyzed Clear System* [1] | | | | | |
| Acrysol RM-825 | 3.5 | 26 sec | 22 sec | Clear | Clear |
| Compound 1 | 3.5 | 50 sec | 34 sec | Clear | Clear |
| Compound 1 | 2.6 | 31 sec | 26 sec | Clear | Clear |
| *Hydrocoate Clear Wood Lacquer* [4] | | | | | |
| Acrysol RM-825 | 0.75 | 30 sec | | Clear | |
| Compound 1 | 0.75 | Not Dispersed | | — | |
| *Air Products - Formula 12779-33* [5] | | | | | |
| Compound 1 | 0.53 | Not Fully Dispersed | | | |

|  | Loading Level lbs/100 gal | Viscosity #2 ZAHN CUP | | Polyester 3 mils Wet on Clear | 3 mils Wet on Black Sealed Paper |
|---|---|---|---|---|---|
| *S. C. Johnson - Formula 231-CM* [2] | | | | | |
| Acrysol RM-825 | 2.0 | 30 sec | | Clear | Clear |
| Compound 1 | 2.0 | 42 sec | | Clear | Clear |
| *Rohm & Haas Formula WR-104-10LF* [3] | | | | | |
| Acrysol RM-825 | 2.1 | 27 sec | | | |
| Compound 1 | 2.1 | Not Dispersed | | | |

The different formulation were dried as follows:
[1] and [2]: 15 min. air dry at room temperature followed by 5 min. at 150° F.
[3] and [4]: air dry overnight at room temperature.
[5]: 15 min. at 150° F.

DISCUSSION OF RESULTS

The $C_{20}$ branched cap polymer, Compound 1, provided good dispersion and dry film clarity in two systems, but was not readily dispersible in the other three systems as shown in Table 2. Here the total carbon content of the cap was too high to permit ready dispersion into all five systems, so in the experiment described below the total carbon content of the branched caps was reduced to monitor this effect.

EXAMPLE 7: ADDITIONAL INVENTION POLYMERS WITH VARIOUS CAPPING AGENTS

The molecular weight of the branched caps used was lowered by using Isofol 16, Isofol 18T (a mixture of $C_{16}$, $C_{18}$, and $C_{20}$ branched alcohols), and compared to Compound 1 made with Isofol 20. Also compared were prior art polyurethane latex thickener-type products made with linear capping alcohols. These results can be found in Table 3 where the experimental additives were tested in the acid-catalyzed and S. C. Johnson clear coat formulations.

TABLE 3

RESULTS IN ACID-CATALYZED CLEAR SYSTEM

| CAPPING AGENT | LOADING LEVEL % Tot. Wt. | VISCOSITY #2 ZAHN NO CATALYST (sec) | VISCOSITY #2 ZAHN W/CATALYST (sec) | 3 mils Wet on CLEAR POLYESTER | 3 mils Wet on BLACK SEALED PAPER |
|---|---|---|---|---|---|
| 1-Hexadecanol | 3.5 | 20 | 18 | Clear | Clear |
| 1-Octadecanol | 3.5 | 20 | 18 | Clear | Clear |
| NACOL 20-95 | 3.5 | 55 | 34 | Hazy | Hazy |
| Isofol 16 | 3.5 | 28 | 24 | Clear | Clear |
| Isofol 18T | 3.5 | 22 | 20 | Clear | Clear |
| Isofol 20 | 3.5 | 50 | 34 | Clear | Clear |

TABLE 3-continued

RESULTS IN S. C. JOHNSON SCX-1959 FORM

| CAPPING AGENT | LOADING LEVEL lbs/100 GAL. | VISCOSITY #2 ZAHN CUP (sec) | 3 mils Wet ON CLEAR POLYESTER | 3 mils Wet ON BLACK SEALED PAPER |
|---|---|---|---|---|
| 1-Hexadecanol | 2.0 | 18 | Clear | Clear |
| 1-Octadecanol | 2.0 | 19 | Clear | Clear |
| NACOL 20-95 | 2.0 | 22 | Clear | Clear |
| Isofol 16 | 2.0 | 21 | Clear | Clear |
| Isofol 1BT | 2.0 | 20 | Clear | Clear |
| Isofol 20 | 2.0 | 30 | Clear | Clear |

All of the samples in this example were laboratory-produced samples synthesized in toluene as follows:

To a 500 ml, 4-necked flask equipped with nitrogen inlet, stirrer, Dean-Stark trap, condenser, and heating mantle was added 350 ml of toluene and 80.0 g of a blend of 3350 and 8000 molecular weight poly(ethylene glycol) to give an average molecular weight of 3440 g/mole. This mixture was heated to 110° C. and 100 ml of water/toluene was azeotroped off; the flask is then cooled to 75° C. 6.52 g of VESTANAT TMDI from Huls America, Inc. and 0.10 g dibutyltin dilaurate catalyst was added to the flask and the reaction was held under a nitrogen blanket at 75° C. for three hours. The capping agents were added to the reaction and, after one hour, the solution poured into an evaporation pan to remove the toluene and isolate the solid product. This solid product was then dissolved in water/co-solvent to give the following final product composition: 25% Polymer/18.5% butyl carbitol/56.5% water.

The amounts for the individual capping agents were as follows:

| Branched: | Isofol 16 = 3.75 g |
| | Isofol 18T = 4.28 g |
| | Isofol 20 = 4.62 g |
| Linear: | 1-hexadecanol = 3.75 g |
| | 1-octadecanol = 4.19 g |
| | NACOL 20-95* = 4.78 g |

*Linear $C_{20}$ Alcohol available from CONDEA Vista Company.

DISCUSSION OF RESULTS

By examining the results in Table 3, it can be seen that the reaction product made with branched $C_{16}$, $C_{18}$, and $C_{20}$, caps all produce clear films although the efficiency of thickening is highest for the branched $C_{20}$ cap. Note also the comparison of the linear $C_{16}$, $C_{18}$, and $C_{20}$ caps where the linear $C_{20}$ cap gave a film that dried to a hazy clarity in the acid catalyzed coating

EXAMPLE 8: ADDITIONAL INVENTION COMPOUNDS

This example represented an attempt to slightly lower the molecular weight of the branched $C_{20}$ reaction product by using as the capping agent a mixture of Isofol 16 and Isofol 20 (25 and 75% by moles, respectively) to yield an average of $C_{19}$. It was believed that this approach would generally increase the dispersibility in clear coat formulas since earlier experiments had highlighted limited dispersibility of the $C_{20}$ based product, see Table 2. The synthesis of this sample parallels that of the samples in Example 6 with the only change being the capping agents; a blend of 3.47 g Isofol 20 and 0.94 g Isofol 16 was used. The product was designated Compound 3. The $C_{19}$ average molecular weight RA was tested in five commercial clear coat formulations; the results can be found in Table 4. The results clearly demonstrate good efficiency, film clarity and ease of dispersibility in all five systems.

TABLE 4

Evaluation of Compound 3 in Various Clear Coat Formulas

| | LOADING LEVEL | VISCOSITY #2 ZAHN NO CATALYST (sec) | VISCOSITY #2 ZAHN W/CATALYST (sec) | 3 mils Wet ON CLEAR POLYESTER |
|---|---|---|---|---|
| Acid-Catalyzed Clear System | | | | |
| Acrysol RM-825 | 3.5[1] | 25 | 23 | Clear |
| Compound 3 | 2.2[1] | 25 | 23 | Clear |
| Rohm & Haas - WR-104-10LF | | | | |
| Acrysol RM-825 | 2.0[2] | 28 | — | Clear |
| Compound 3 | 2.0[2] | 45 | — | Clear |
| S. C. Johnson - SCX-1959 | | | | |
| Acrysol RM-825 | 2.0[2] | 23 | — | Clear |
| Compound 3 | 2.0[2] | 52 | — | Clear |
| Air Products - 12779-33 | | | | |
| Acrysol RM-825 | 0.4[1] | 31 | — | Clear* |
| Compound 3 | 0.4[1] | 41 | — | Clear* |

TABLE 4-continued

Evaluation of Compound 3 in Various Clear Coat Formulas

|  | LOADING LEVEL | VISCOSITY #2 ZAHN NO CATALYST (sec) | VISCOSITY #2 ZAHN W/CATALYST (sec) | 3 mils Wet ON CLEAR POLYESTER |
|---|---|---|---|---|
| Hydrocote - Clear |  |  |  |  |
| Acrysol RM-825 | 0.4① | 60 | — | Clear |
| Compound 3 | 0.4① | 70 | — | Clear |

① = % of Total Weight
② = lb/100 gallons

EXAMPLE 9: ADDITIONAL INVENTION EXAMPLE

Based upon the above results, a decision was made to synthesize reaction products with mixtures of branched caps to vary the molecular weight of the caps. The base material similar to Example 3 was synthesized with average branched caps of $C_{18}$ and $C_{19}$ (employing Isofol 16 and Isofol 20). The synthesis of these samples was the same as that given in Example 3, except for the change in capping agents. For the $C_{18}$ cap length, 30.48 g Isofol 16 and 37.53 g Isofol 20 were used, this sample was designated Compound 4. For the $C_{19}$ cap length, 15.24 g Isofol 16 and 56.31 g Isofol 20 were used, this sample was designated Compound 5. The samples were tested in the acid-catalyzed masterbatch and Rohm and Haas WA-104-LF formulations (see Table 5).

TABLE 5

|  | R/A Level | Viscosity #2 Zahn No Cat. (sec) | Viscosity #2 Zahn w/Cat (sec) | 3 mils Wet ON Clear Polyester |
|---|---|---|---|---|
| Acid-Catalyzed Clear System |  |  |  |  |
| Acrysol RM-825 | 3.5① | 25 | 23 | Clear |
| Compound 4 | 2.2① | 25 | 23 | Clear |
| Compound 5 | 2.2① | 25 | 23 | Clear |
| Rohm & Haas WA-104-LF |  |  |  |  |
| Acrysol RM-825 | 2.0② | 33 | — | Clear |
| Compound 4 | 2.0② | 37 | — | Clear |
| Compound 5 | 2.0② | 32 | — | Clear |

①% of Total Formula weight
②lbs/100 gallons

DISCUSSION OF RESULTS

Both the $C_{18}$ and $C_{19}$ mixed branched caps produced acceptable clearcoat thickeners i.e. good efficiency and dried film clarity, with the $C_{18}$ sample being more efficient and more readily dispersible.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A polyurethane thickener especially suitable for clear aqueous systems comprised of the reaction product of:
   a) one or more polyisocyanates;
   b) one or more polyether polyols; and
   c) one or more branched capping agents comprising a branched alcohol having the structure:

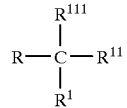

where $R=HO-CH_2-(CH_2)_k$ with k=0 to 4
   $R^1=(CH_2)_m\ CH_3$ where m=4 to 14
   $R^{11}=(CH_2)_N\ CH_3$ where n=2 to 10 and
   $R^{111}$, $CH_3$ or $C_2\ H_5$ with H being preferred.

2. The thickener of claim 1 wherein an additional reactant d) comprised of one or more modifying agents having at least two moieties reactive with component a) or b) and at least one hydrophobic group is utilized.

3. The thickener of claim 1 wherein reactants a) and b) are in a ratio range of one to the other from about 2:1 to about 1:2.

4. The thickener of claim 1 wherein reactant a) is 1,6-hexamethylene diisocyanate, reactant b) is polyethylene glycol, c) and reactant c) is a branched aliphatic alcohol.

5. The thickener of claim 1 wherein reactant c) contains a total number of carbon atoms from 10 to 24.

6. The thickener of claim 1 wherein reactant c) is added after the reaction of reactants a) and b) is substantially complete.

7. The thickener of claim 1 wherein the reaction product is prepared using substantially no solvent.

8. A process for producing a polyurethane thickener especially suitable for aqueous systems comprising producing a polymer as the reaction product of:
   a) one or more polyisocyanates;
   b) one or more polyether polyols; and
   c) one or more branched capping agents comprising a branched alcohol having the structure:

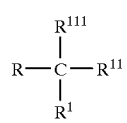

where R $HO-CH_2-(CH_2)_k$ with k=0 to 4
   $R^1=(CH_2)_m CH_3$ where m=4 to 14
   $R^{11}=(CH_2)_n CH_3$ where n=2 to 10.

9. The process of claim 8 wherein a reactant d) comprised of one or more modifying agents having at least two moieties reactive with component a) or b) and at least one hydrophobic group is utilized.

10. The process of claim 8 wherein the polyurethane thickener is produced using toluene as a solvent.

11. The process of claim 8 wherein the polyurethane thickener is produced with substantially no solvent.

12. The process of claim 8 wherein reactant c) is a branched aliphatic alcohol.

13. The process of claim 8 wherein the reaction product is prepared using substantially no solvent.

14. The process of claim 8 wherein reactant c) contains a total number of carbon atoms from 10 to 24.

15. The process of claim 8 wherein reactant c) is added after the reaction of reactants a) and b) is substantially complete.

16. A method of providing thickening properties to a clear aqueous system comprising the steps of:
   i) producing a polyurethane thickening composition made by the process of claim 8, and
   ii) dispersing the polymer of step a) into a clear aqueous system thereby thickening said system.

17. The method of claim 16 wherein the amount of said polyurethane thickener composition used is between 0.01% and 10% of the amount of the clear aqueous system, such percent being based on the amount of the clear aqueous system.

18. A clear aqueous system containing the thickener of claim 1.

19. The clear aqueous system of claim 18 wherein such system is selected from the group consisting of automotive clear coats, water-based varnishes and textile finishes.

20. The clear aqueous system of claim 18 wherein said aqueous system also contains solvent.

21. The clear aqueous system of claim 18 wherein the thickener comprises from between 0.01% to 10% of the clear aqueous system.

* * * * *

UNITED STATES PATENT AND TRADEMARK OFFICE
CERTIFICATE OF CORRECTION

PATENT NO. : 5,973,063
DATED : October 26, 1999
INVENTOR(S) : Joseph Doolan et al.

Page 1 of 2

It is certified that error appears in the above-indentified patent and that said Letters Patent is hereby corrected as shown below:

Title page,
In the ABSTRACT [57]:

Line 2, change "Theological" to --rheological--.
Line 6, change "Theological" to --rheological--.

Col. 1, line 38, change "Theological" to --rheological--.
Col. 1, line 42, change "Theological" to --rheological--.
Col. 1, line 58, change "Theological" to --rheological--.
Col. 2, line 9, change "Theological" to --rheological--.
Col. 2, line 13, change "Theological" to --rheological--.
Col. 2, line 15, change "Theological" to --rheological--.
Col. 2, line 29, change "Theological" to --rheological--.
Col. 2, line 36, change "Theological" to --rheological--.
Col. 2, line 60, change "Theological" to --rheological--.
Col. 3, line 40, change "Theological" to --rheological--.
Col. 3, line 45, change "Theological" to --rheological--.
Col. 3, line 50, change "Theological" to --rheological--.
Col. 3, line 57, change "Theological" to --rheological--.
Col. 5, line 10, change "Theological" to --rheological--.
Col. 11, line 2, change "Theological" to --rheological--.
Col. 12, line 7, change "Theological" to --rheological--.
Col. 12, line 59, change "Theological" to --rheological--.

UNITED STATES PATENT AND TRADEMARK OFFICE
CERTIFICATE OF CORRECTION

PATENT NO. : 5,973,063
DATED : October 26, 1999
INVENTOR(S) : Joseph doolan, et. al.

It is certified that error appears in the above-identified patent and that said Letters Patent is hereby corrected as shown below:

Col. 18, line 27, change "$(CH_2)N\ CH_3$" to --$(CH_2)_n\ CH_3$--.
Col. 18, line 28, change "$R^H_1$" to --$R^{111} = H_1$--.

Signed and Sealed this

Thirtieth Day of May, 2000

Attest:

Attesting Officer

Q. TODD DICKINSON

Director of Patents and Trademarks